US006964631B2

(12) United States Patent
Moses et al.

(10) Patent No.: US 6,964,631 B2
(45) Date of Patent: Nov. 15, 2005

(54) INTEGRATED ELECTRIC MOTOR-DRIVEN OIL PUMP FOR AUTOMATIC TRANSMISSIONS IN HYBRID APPLICATIONS

(75) Inventors: Robert L. Moses, Ann Arbor, MI (US); John R. Maten, Royal Oak, MI (US)

(73) Assignee: General Motors Corporation, Detroit, MI (US)

( * ) Notice: Subject to any disclaimer, the term of this patent is extended or adjusted under 35 U.S.C. 154(b) by 66 days.

(21) Appl. No.: 10/785,508

(22) Filed: Feb. 24, 2004

(65) Prior Publication Data

US 2005/0187066 A1 Aug. 25, 2005

(51) Int. Cl.[7] ................................................ B60K 6/02
(52) U.S. Cl. ........................................ 477/3; 180/65.2
(58) Field of Search ........................... 477/3, 5; 475/5, 475/159; 180/65.2, 65.6, 65.7

(56) References Cited

U.S. PATENT DOCUMENTS

| 5,474,428 | A | | 12/1995 | Kimura et al. ................. 417/16 |
| 5,558,173 | A | | 9/1996 | Sherman ..................... 180/53.8 |
| 5,799,744 | A | * | 9/1998 | Yamaguchi et al. ............ 475/5 |
| 5,823,282 | A | * | 10/1998 | Yamaguchi ..................... 477/5 |
| 6,575,865 | B2 | * | 6/2003 | Takenaka et al. ............... 475/5 |
| 6,638,022 | B2 | * | 10/2003 | Shimabukuro et al. ........ 417/2 |
| 6,656,083 | B2 | * | 12/2003 | Esaki ............................. 477/5 |

* cited by examiner

Primary Examiner—Sherry Estremsky
(74) Attorney, Agent, or Firm—Leslie C. Hodges; Christopher DeVries

(57) ABSTRACT

An electric motor is connected solidly to the main transmission oil pump shaft on the transmission case. An off-axis chain and gear are connected to the main oil pump shaft via a single freewheeling clutch, so that either source of torque in a hybrid motor can drive the oil pump or the oil pump can be driven by the electric motor or the hybrid motor depending on which motor is traveling at a higher speed.

12 Claims, 1 Drawing Sheet

INTEGRATED ELECTRIC MOTOR-DRIVEN OIL PUMP FOR AUTOMATIC TRANSMISSIONS IN HYBRID APPLICATIONS

TECHNICAL FIELD

This invention relates to a vehicle transmission which is capable of receiving input torque from both an electric motor and an internal combustion engine and which uses an electric oil pump to produce pressure to the transmission.

BACKGROUND OF THE INVENTION

Prior art power transmissions have been provided utilizing planetary gear sets and clutches which can be configured so that accessories normally operated by an internal combustion engine can be driven by an electric motor/generator; see U.S. Pat. No. 5,558,173 issued Sep. 24, 1996 and commonly assigned as this application. As in most prior art designs, accessories are driven through belt connections to the internal combustion engine. Such accessories have included oil pumps, power steering pumps and transmission oil pumps. Because such pumps are generally belt-driven from the internal combustion engine, they idle when the engine is not running.

There are current applications that use an electric oil pump in hybrid transmission applications, but they tend to be stand alone pumps with pump rotor and electric motor, i.e., a full function electric oil pump. And the integration of a separate electric oil pump with the hydraulic control circuit of the transmission presents challenges such as providing a suction feed and a pressure feed back into the transmission.

An oil pump driving device has been used to drive an oil pump combined with a transmission coupled to an engine for supplying working oil to lubricate the transmission and enable the transmission to make gear shifts; see U.S. Pat. No. 5,474,428 to Kimura et al. issued Dec. 12, 1995. The transmission includes a first power transmitting mechanism for connecting the output shaft of an electric motor to the drive shaft of the oil pump, and a second power transmitting path for connecting the output shaft of the engine to the drive shaft of the oil pump. A controller for selecting one of the first and second power transmitting mechanisms at a time selects the first transmitting mechanism to drive the oil pump with the electric motor when the rotational speed of the output shaft of the engine is lower than a predetermined speed, and selects the second power transmitting mechanism to drive the oil pump with the engine when the rotational speed of the output shaft of the engine exceeds the predetermined speed. But such oil pump arrangements use a gear pump, two one-way clutches, and a controller to select the clutch.

SUMMARY OF THE INVENTION

This invention adds an electric motor that is connected to the main transmission oil pump shaft which is already present in the transmission. The main oil pump shaft is connected solidly to the added electric motor. An off-axis chain and gear are connected to the main oil pump shaft via a single freewheeling clutch, such that either the electric motor or the internal combustion (IC) engine/torque converter pump drive gear or sprocket can drive the oil pump itself, whichever motor (electric or IC) is traveling at a higher speed. This allows the pump to produce pressure to the transmission system without the engine running, i.e., idling. This invention results in a minimum number of additional parts and allows a seamless transition of which torque or motor source in the hybrid arrangement is driving the main oil pump.

This invention can also be used on other automatic transmissions by utilizing an electric motor in an off-axis configuration and coupling the motor to the main pump drive mechanism in a similar fashion with the free-wheeling clutch as described above.

This invention reduces cost over a full function electric oil pump and provides a more seamless transition when the switch is made over which motor or torque source (electric or IC engine) is driving the main oil pump.

This invention is also a hybrid vehicle powertrain which comprises a first source of torque; a second source of torque; a hybrid power transmission including a pump operable for pumping transmission oil in response to torque from said first or second source; and a third source of torque for operating said pump when said pump is not being operated by any of said first and second sources of torque.

This invention is also a hybrid powertrain for a vehicle which comprises a first source of torque; and a second source or torque. A hybrid power transmission integrates the first and second sources of torque and has an input pump shaft rotatable in response to one of the first and second sources of torque, and a transmission oil pump drive shaft which is off-axis from said input pump shaft. The transmission includes an oil pump rotor selectively rotatable by said input pump shaft at a first speed. An electric motor is drivably connected to the oil pump drive shaft to selectively rotate the oil pump rotor at a second speed, wherein the oil pump rotor is rotatable by said electric motor or said input pump shaft of said transmission in response respectively to which of the first and second speeds is higher.

The invention is also a powertrain for a vehicle which comprises a first source of torque; a second source of torque; a hybrid power transmission which integrates the first and second sources of torque and has an input shaft rotatable in response to one of said first and second sources of torque. The powertrain also comprises a pump drive sprocket drivable by the input shaft; a pump-driven sprocket drivable by said pump drive sprocket; and a pump drive shaft mounted with respect to said transmission and which has an oil pump rotor drivably connected to a first portion of the pump drive shaft. An electric motor is drivably connected to a second portion of the pump drive shaft and a pump-driven sprocket is selectively drivably connected to said pump drive shaft, and a pump chain rotatably connects said pump drive sprocket to said pump-driven sprocket, so that the rotation of said input shaft in one direction selectively drives the pump-driven sprocket to drive said oil pump rotor, and so that the pump drive shaft is driven by the electric motor when the rotation of said input shaft is not rotating in said one direction.

This invention is also an oil pump with a transmission coupled to an engine for supplying working oil to lubricate the transmission. The oil pump driving device comprises a pump drive sprocket which is rotatable about an axis and driven by the engine, a main transmission oil pump shaft which is offset from the axis of the pump drive sprocket, a pump-driven sprocket which is drivable by the pump drive sprocket, a freewheeler clutch between the oil pump shaft and the pump-driven sprocket and an electric motor which is connected to the oil pump shaft. The freewheeler clutch locks the pump drive sprocket to the pump drive shaft for driving the oil pump from the engine and the freewheeler clutch releases the pump-driven sprocket from the pump drive shaft for driving the oil pump from the electric motor.

The above objects, features and advantages, and other objects, features and advantages of the present invention are readily apparent from the following detailed description of the best modes for carrying out the invention when taken in connection with the accompanying drawings.

DESCRIPTION OF THE PREFERRED EMBODIMENT

With the advent of hybrid powertrains that use an automatic transmission, it is important that oil pressure be maintained in the transmission system when the vehicle engine stops to insure quick re-engagement of the forward clutch or band and/or the continuous variable transmission (CVT) pulleys when the vehicle is requested to move forward again. With the engine off or stopped, the drive for the conventional transmission pump is also stopped. However, the system pressure must be maintained for critical transmission circuits. Separate electric pumps or "tight" oil circuits are two methods that have been used to prevent excessive leakdown to maintain this system pressure. But "tight" oil circuits are difficult to achieve on a production basis. And electric oil pumps can be expensive (depending on requirements) and perform a redundant role when compared to the use of the main oil pump which is already in the transmission. Moreover, the integration of the hydraulic circuit of a separate electric oil pump with the hydraulic control circuit of the transmission also presents challenges such as providing a suction feed and a pressure feed back into the transmission. Another disadvantage of adding a separate electric oil pump is packaging. The packaging space for an electric motor as opposed to an electric oil pump would normally be less.

Figure 1:
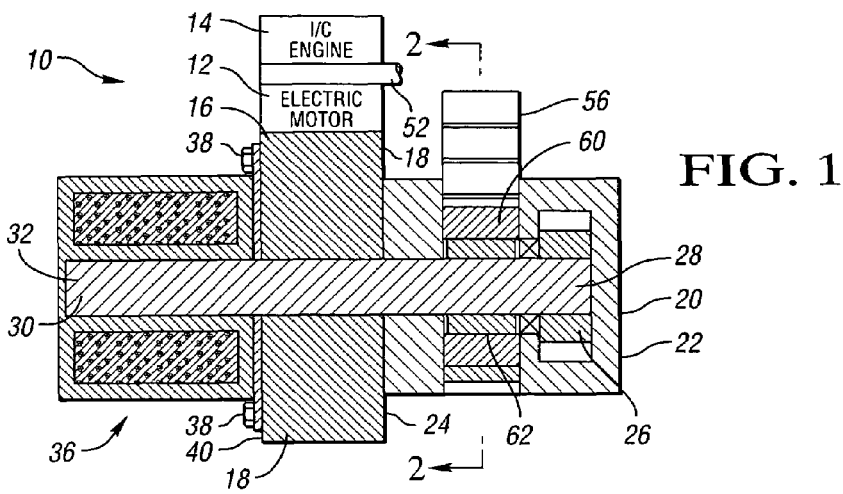
FIG. 1 is a schematic front view of an automatic transmission in a hybrid powertrain with an integrated electric motor-driven oil pump to maintain oil pressure in the transmission.
Figure 2:
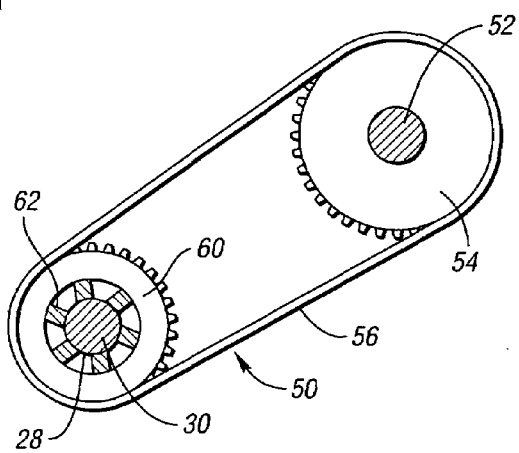
FIG. 2 is a schematic side view of the transmission, taken generally along line 2—2 in FIG. 1, to show a selective drive arrangement for the oil pump where the pump drive shaft is offset from the drive axis of the hybrid engine.

With reference to FIGS. 1 and 2, a hybrid powertrain 10 for this invention includes an electric motor 12 as one source of torque and an internal combustion motor or engine 14 as a second source of torque. Both of the sources of torque 12 or 14 are positioned and operably connected to drive a vehicle through a transmission 16 having a case 18.

A pump 20 includes housing 22 which is mounted with respect to one side 24 of the transmission case 18. Inside the pump 20, the housing encloses a pump rotor 26 and one end or portion 28 of a pump driveshaft 30. The other end 32 extends through the transmission case 18 and connects drivably rotatably with an electric motor 36 which is located by fasteners 38 to the side 40 of the transmission which is opposite to the transmission side 24 which is opposite to the pump 20.

The hybrid powertrain 10 includes a pump drive arrangement 50. The arrangement 50 includes an input pump shaft 52 rotatably connected along the engine axis to one of the first and second sources of torque in the hybrid powertrain. The input pump shaft 52 has affixed thereto for rotation therewith an engine or motor axis pump drive sprocket (wheel) 54. Sprocket 54 drives a pump chain 56.

The pump drive shaft 30 is off-axis with respect to the engine axis and input pump shaft 52 and selectively rotatably drivably connected to a pump-driven sprocket (wheel) 60 by a free-wheeler clutch 62 which could be of the roller or sprag type. Belt and wheels may be used instead of sprockets and chain.

OPERATION

Figures 3, 4:
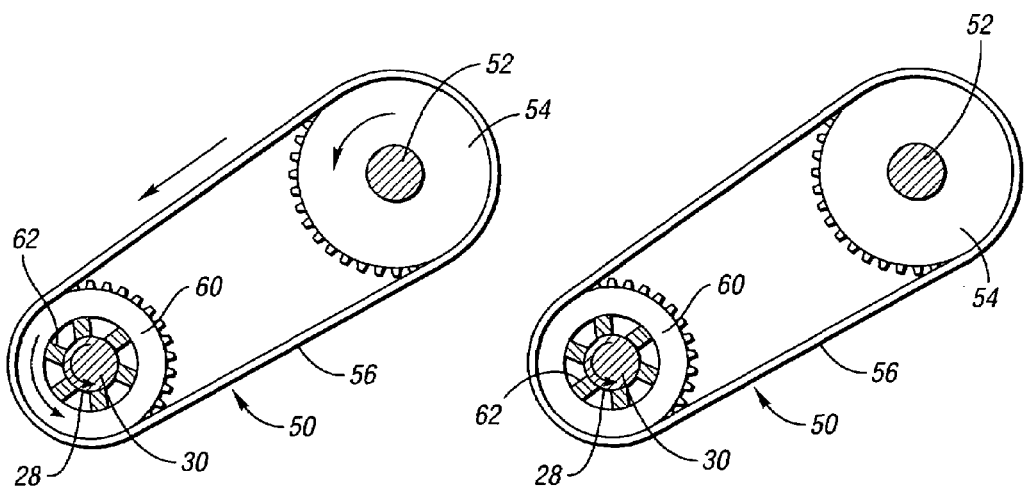
FIG. 3 is a schematic side view of the selective drive arrangement for the oil pump in a normal operation where the drive axis of a hybrid engine drives the pump drive shaft.
FIG. 4 is a schematic side view of the selective drive arrangement for the oil pump in an electric motor operation where the pump drive shaft is driven by the electric motor when either of the hybrid engines is OFF.

Normal pump operation will be described with reference to FIG. 3. The first or second source of torque 12 or 14 rotates the input shaft 52 and sprocket 54 counter clockwise. This drives the pump chain 56 and the pump drive sprocket 60 in a counter-clockwise direction as well. The free-wheeler 62 locks the pump-driven sprocket 60 to the pump drive shaft (oil pump shaft) 30 which turns or rotates the oil pump rotor 26 with pump chain 56 at a higher speed than the pump drive shaft 30.

Electric motor pump operation will be described with reference to FIG. 4. The first or second source of torque is not available so the input pump shaft 52 and the engine axis pump drive sprocket are not turning or rotating and the pump chain 56 is not moving. The free-wheeler 62 releases when the electric motor 36 is driving the pump drive shaft 30 (and the engine is OFF), thereby turning the oil pump drive shaft 30 and its oil pump rotor 26 in a counter-clockwise direction at a higher speed than the input pump shaft 52.

While the best mode for carrying out the invention has been described in detail, those familiar with the art to which this invention relates will recognize various alternative designs and embodiments for practicing the invention within the scope of the appended claims.

What is claimed is:

1. A hybrid powertrain for a vehicle, said powertrain comprising:
   a first source of torque;
   a second source of torque;
   a hybrid power transmission including a pump operable for pumping transmission oil in response to torque from said first or second source; and
   a third source of torque for operating a rotor of said pump when said pump is not being operated by any of said first and second sources of torque.

2. The hybrid powertrain of claim 1 wherein the third source of torque is an electric motor.

3. The hybrid powertrain of claim 1 wherein the first source of torque is an electric motor.

4. The hybrid powertrain of claim 1 wherein the second source of torque is an internal combustion engine.

5. An oil pump driving device for driving an oil pump with a transmission coupled to an engine for supplying working oil to lubricate the transmission, said oil pump driving device comprising:
   a pump drive wheel rotatable about an axis and driven by the engine;
   a main transmission oil pump shaft offset from the axis of said pump drive wheel;

a pump-driven wheel drivable by said pump drive wheel;

a freewheeler clutch between said oil pump shaft and said pump-driven wheel; and an electric motor connected to said oil pump shaft; said freewheeler clutch sufficiently locking said pump-driven wheel to said oil pump shaft for driving the oil pump from said engine; and said freewheeler clutch sufficiently releasing said pump-driven wheel from said oil pump shaft for driving the oil pump from said electric motor.

6. The oil pump driving device of claim 5 wherein the drive and driven wheels are sprockets drivingly connected by a pump chain.

7. The oil pump driving device of claim 5 wherein the freewheeler clutch is a sprag clutch.

8. The oil pump driving device of claim 5 wherein the freewheeler clutch is a roller clutch.

9. A hybrid powertrain for a vehicle, said powertrain comprising:

a first source of torque;

a second source of torque;

a hybrid power transmission integrating said first and second sources of torque and having an input pump shaft rotatable in response to one of said first and second sources of torque, and a transmission oil pump drive shaft off-axis from said input pump shaft and including an oil pump rotor selectively rotatable by said input pump shaft at a first speed; and an electric motor drivably connected to the oil pump drive shaft to selectively rotate the oil pump rotor at a second speed;

said oil pump rotor being rotatable by said electric motor or said input pump shaft of said transmission in response respectively to which of the first and second speeds is higher.

10. A powertrain for a vehicle, said powertrain comprising:

a first source of torque;

a second source of torque;

a hybrid power transmission integrating said first and second sources of torque and having an input shaft rotatable in response to one of said first and second sources of torque;

a pump drive sprocket drivable by said input shaft;

a pump-driven sprocket drivable by said pump drive sprocket;

a pump drive shaft mounted with respect to said transmission and having an oil pump rotor drivably connected to a first portion of the pump drive shaft, and an electric motor drivably connected to a second portion of the pump drive shaft, and said pump-driven sprocket selectively drivably connected to said pump drive shaft;

a pump chain rotatably connecting said pump drive sprocket to said pump-driven sprocket;

the rotation of said input shaft in one direction selectively driving said pump-driven sprocket to drive said oil pump rotor; and said pump drive shaft being driven by the electric motor when said input shaft is not rotating in said one direction.

11. The powertrain of claim 10 including a freewheeler clutch operable between the pump drive shaft and the pump-driven sprocket.

12. The powertrain of claim 11 wherein the freewheeler clutch is operable to drive the pump drive shaft when the oil pump shaft is not being rotated by the electric motor.

* * * * *